United States Patent
Unnikrishnan

(10) Patent No.: US 10,983,614 B2
(45) Date of Patent: Apr. 20, 2021

(54) COMPUTER MICE, METHODS FOR CONTROLLING A COMPUTER MOUSE, MOUSE PADS, METHODS FOR CONTROLLING A MOUSE PAD, AND COMPUTER-READABLE MEDIA

(71) Applicant: RAZER (ASIA-PACIFIC) PTE. LTD., Singapore (SG)

(72) Inventor: Sreenath Unnikrishnan, Singapore (SG)

(73) Assignee: RAZER (ASIA-PACIFIC) PTE. LTD.

( * ) Notice: Subject to any disclaimer, the term of this patent is extended or adjusted under 35 U.S.C. 154(b) by 0 days.

(21) Appl. No.: 16/337,869

(22) PCT Filed: Oct. 11, 2016

(86) PCT No.: PCT/SG2016/050501
§ 371 (c)(1),
(2) Date: Mar. 28, 2019

(87) PCT Pub. No.: WO2018/070930
PCT Pub. Date: Apr. 19, 2018

(65) Prior Publication Data
US 2020/0026366 A1    Jan. 23, 2020

(51) Int. Cl.
*G06F 3/039* (2013.01)
*A63F 13/23* (2014.01)
(Continued)

(52) U.S. Cl.
CPC ............ *G06F 3/0395* (2013.01); *A63F 13/23* (2014.09); *A63F 13/24* (2014.09); *G06F 3/038* (2013.01);
(Continued)

(58) Field of Classification Search
CPC . G06F 3/016; G06F 3/0395; H01H 2003/008; A63F 13/23
See application file for complete search history.

(56) References Cited

U.S. PATENT DOCUMENTS

| | | |
|---|---|---|
| 4,868,549 A | 9/1989 | Affinito et al. |
| 5,696,537 A | 12/1997 | Solhjell |

(Continued)

FOREIGN PATENT DOCUMENTS

| | | |
|---|---|---|
| CN | 201853198 U | 6/2011 |
| DE | 10215638 A1 | 10/2002 |

(Continued)

OTHER PUBLICATIONS

Extended European Search Report dated Jul. 29, 2019, 7 pages, for the corresponding European Patent Application No. 16918942.0.
(Continued)

*Primary Examiner* — David L Lewis
*Assistant Examiner* — Robert E Mosser
(74) *Attorney, Agent, or Firm* — Polsinelli PC

(57) ABSTRACT

According to various embodiments, a computer mouse may be provided. The computer mouse may include: an electromagnet configured to provide a force between the computer mouse and a surface on which the computer mouse is moveable; and a control circuit configured to control the electromagnet based on an application running on a computer to which the computer mouse connectable.

12 Claims, 2 Drawing Sheets

(51) Int. Cl.
*A63F 13/24* (2014.01)
*G06F 3/0354* (2013.01)
*G06F 3/038* (2013.01)

(52) U.S. Cl.
CPC .. *G06F 3/03543* (2013.01); *A63F 2300/1025* (2013.01); *A63F 2300/1043* (2013.01)

(56) References Cited

U.S. PATENT DOCUMENTS

| | | |
|---|---|---|
| 6,504,528 B1 | 1/2003 | Kermani et al. |
| 7,009,597 B1 | 3/2006 | Ames |
| 2002/0002935 A1 | 1/2002 | Lease et al. |
| 2003/0038782 A1 | 2/2003 | Dobrich |
| 2009/0183098 A1* | 7/2009 | Casparian ............. G06F 3/0238 715/765 |
| 2009/0265897 A1* | 10/2009 | Haynes ................. G06F 3/0395 24/303 |
| 2011/0122064 A1 | 5/2011 | Deng |
| 2015/0286295 A1 | 10/2015 | Pepe |

FOREIGN PATENT DOCUMENTS

| | | |
|---|---|---|
| GB | 2286034 A | 8/1995 |
| KR | 20020043205 A | 6/2002 |
| KR | 20110129593 A | 12/2011 |
| WO | WO 00/11598 A1 | 3/2000 |

OTHER PUBLICATIONS

International Search Report and Written Opinion, dated Jul. 10, 2017, for the corresponding International Application No. PCT/SG2016/050501 in 10 pages.

* cited by examiner

COMPUTER MICE, METHODS FOR CONTROLLING A COMPUTER MOUSE, MOUSE PADS, METHODS FOR CONTROLLING A MOUSE PAD, AND COMPUTER-READABLE MEDIA

TECHNICAL FIELD

Various embodiments generally relate to computer mice, methods for controlling a computer mouse, mouse pads, methods for controlling a mouse pad, and computer-readable media.

BACKGROUND

Mouse mats are required to ensure consistent tracking performance from mice, making them especially important to gaming as compared to office usage. Arguably, the most important aspect of a mouse mat is the glide that the user obtains from it, which influences how much speed or precision they get from their mouse mats. As a result, there exist many different kinds of mouse mats in the market, for example, those with soft surfaces (for example cloth surfaces) and those with hard surfaces (for example may from polycarbonate or other material). Additionally, there are also mouse mats available which can be flipped for a change of surfaces on the go.

SUMMARY OF THE INVENTION

According to various embodiments, a computer mouse may be provided. The computer mouse may include: an electromagnet configured to provide a force between the computer mouse and a surface on which the computer mouse is moveable; and a control circuit configured to control the electromagnet based on an application running on a computer to which the computer mouse is connectable.

According to various embodiments, a method for controlling a computer mouse may be provided. The method may include: providing an electromagnet to provide a force between the computer mouse and a surface on which the computer mouse is moveable; and controlling the electromagnet based on an application running on a computer to which the computer mouse is connectable.

According to various embodiments, a computer-readable medium may be provided. The computer-readable medium may include instructions which, when executed by a computer, make the computer perform a method for controlling a computer mouse. The method may include: providing an electromagnet to provide a force between the computer mouse and a surface on which the computer mouse is moveable; and controlling the electromagnet based on an application running on a computer to which the computer mouse is connectable.

According to various embodiments, a mouse pad may be provided. The mouse pad may include: an electromagnet configured to provide a force between the mouse pad and a computer mouse which is moveable on the mouse pad; and a control circuit configured to control the electromagnet based on an application running on a computer to which the computer mouse is connectable.

According to various embodiments, a method for controlling a mouse pad may be provided. The method may include: providing an electromagnet to provide a force between the mouse pad and a computer mouse which is moveable on the mouse pad; and controlling the electromagnet based on an application running on a computer to which the computer mouse is connectable.

According to various embodiments, a computer-readable medium may be provided. The computer-readable medium may include instructions which, when executed by a computer, make the computer perform a method for controlling a mouse pad. The method may include: providing an electromagnet to provide a force between the mouse pad and a computer mouse which is moveable on the mouse pad; and controlling the electromagnet based on an application running on a computer to which the computer mouse is connectable.

According to various embodiments, a computer mouse may be provided. The computer mouse may include: a receiving port configured to receive a permanent magnet for providing a force between the computer mouse and a surface on which the computer mouse is moveable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

Figure 1:
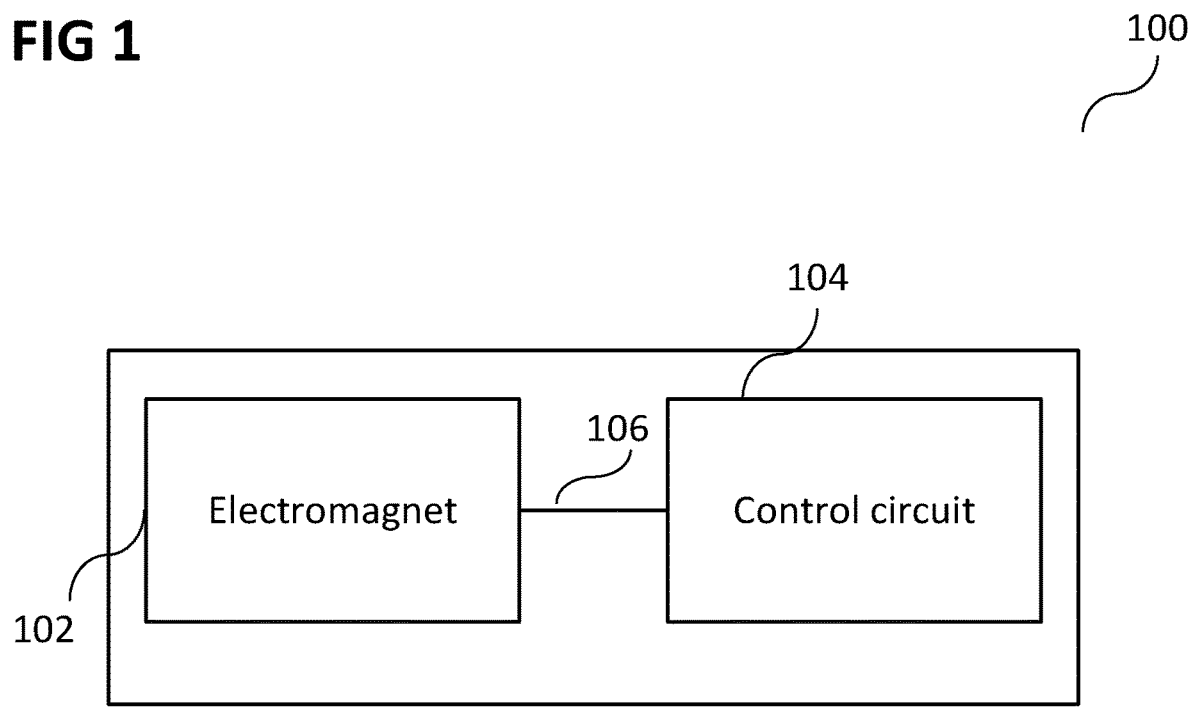
FIG. 1 shows a computer mouse according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the computer mouse as described in this description may include a memory which is for example used in the processing carried out in the computer mouse. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

Mouse mats are required to ensure consistent tracking performance from mice, making them especially important to gaming as compared to office usage. Arguably, the most important aspect of a mouse mat is the glide that the user obtains from it, which influences how much speed or precision they get from their mouse mats. As a result, there exist many different kinds of mouse mats in the market, for example, those with soft surfaces (for example cloth surfaces) and those with hard surfaces (for example may from polycarbonate or other material). Additionally, there are also mouse mats available which can be flipped for a change of surfaces on the go. There are many different options for mousemat surfaces in the market. A disadvantage of these mouse mats is the fact that without buying more than one mouse mat, users have access to at the most two surfaces at the same time.

The texture and hardness of a mouse mat greatly influences the glide/friction between the mouse movement on the mat surface. However, this glide is typically not adjustable once a user buys the mouse mat, which in many cases the user is not able to test before buying.

For commonly available mice and mousemats, the user is limited to just one type of glide with a mouse and mousemat combination. This is influenced by the mouse feet and the texture, hardness of kind of material the mouse mat is made of. Since nearly all mice on the market use Teflon feet, this leaves the glide of the mouse to be impacted by the mouse mat only. There are also some dual sided mouse mats available on the market, which give users the option of two different friction/glide settings at the most.

According to various embodiments, a way for way users to adjust the friction between the mouse and the mousemat on the fly may be provided, obtaining the glide preferred by them.

According to various embodiments, various embodiments may be provided which let users customize the glide on their mouse/mouse mat combination to suit their needs, on the go. This may be based on the kind of game they are playing at that time (for example, higher friction may allow for more precision for FPS (first person shooter) games, while lower friction allows for more speed for MOBA (multiplayer online battle arena) games. This may also be to adjust the glide to the user's preference, regardless of the glide allowed by the mousemat out of the box.

According to various embodiments, an adjustable glide on the fly (in other words: an on the fly adjustable glide) for mouse and mouse mat combination may be provided. In other words, glide properties between a mouse and a mouse mat (or any other surface on which the mouse is moving) may be adjustable on the fly.

In terms of user experience, every gamer has different preferences which, in many cases, even differ depending on the usage (office use or gaming) or on the type of game (for example FPS, MOBA, or MMO (massively multiplayer online) game). One aspects of gaming is the interaction between the mouse and the mousemat (or any other surface on which the mouse is used) which determines the glide of the mouse on the surface. According to various embodiments, devices may be provided which give the user a way to customize the glide for the same mouse and mouse mat (or any other surface) combination. In order to do that, the glide may be influenced by an external force.

FIG. 1 shows a computer mouse 100 according to various embodiments. The computer mouse 100 may include an electromagnet 102 configured to provide a force between the computer mouse 100 and a surface on which the computer mouse is moveable. The computer mouse 100 may further include a control circuit 104 configured to control the electromagnet 102 based on an application running on a computer to which the computer mouse 100 is connectable. The electromagnet 102 and the control circuit 104 may be coupled with each other, like indicated by line 106, for example electrically coupled, for example using a line or a cable, and/ or mechanically coupled.

In other words, according to various embodiments, an electromagnet in a computer mouse may be controlled to adjust the force between the computer mouse and a mousepad (or mousemat) as the surface on which the computer mouse is moving based on an application running on a computer to which the computer mouse 100 is connected.

According to various embodiments, the control circuit 104 may be configured to control the electromagnet 102 based on a type of application running on the computer.

According to various embodiments, the type may include or may be an item selected from a list consisting of first person shooter games, multiplayer online battle arena games, and massively multiplayer online games.

According to various embodiments, the control circuit 104 may be configured to control the electromagnet 102 based at least one of a level of required precision for using the application or a level of required speed for using the application.

According to various embodiments, the computer mouse 100 may be configured to determine a translatory movement of the computer mouse 100 on the surface.

Figure 2:
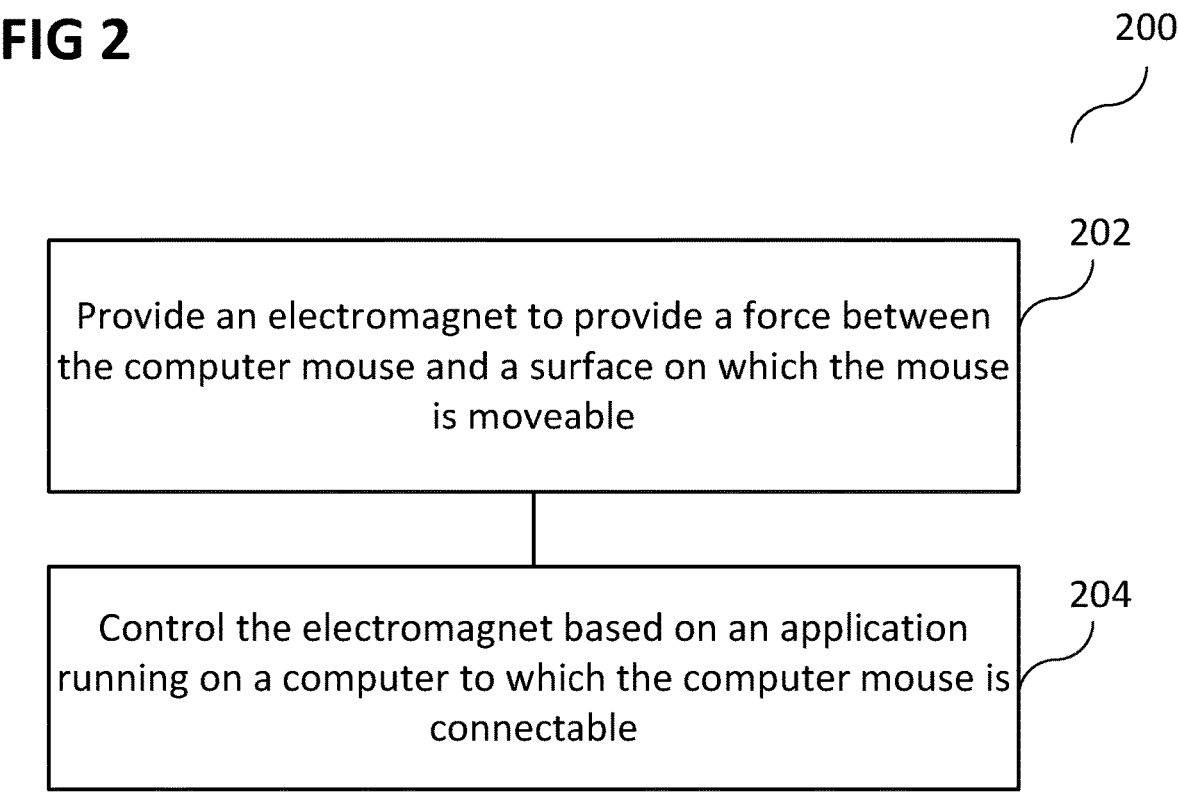
FIG. 2 shows a flow diagram illustrating a method for controlling a computer mouse according to various embodiments.

FIG. 2 shows a flow diagram 200 illustrating a method for controlling a computer mouse. In 202, an electromagnet may be provided to provide a force between the computer mouse and a surface on which the computer mouse is moveable. In 204, the electromagnet may be controlled based on an application running on a computer to which the computer mouse is connectable.

According to various embodiments, the electromagnet may be controlled based on a type of application running on the computer.

According to various embodiments, the type may include or may be an item selected from a list consisting of first person shooter games, multiplayer online battle arena games, and massively multiplayer online games.

According to various embodiments, the electromagnet may be controlled based at least one of a level of required precision for using the application or a level of required speed for using the application.

According to various embodiments, the method may further include determining a translatory movement of the computer mouse on the surface.

According to various embodiments, a computer-readable medium may include instructions which, when executed by a computer, make the computer perform a method for controlling a computer mouse. The method may include: providing an electromagnet to provide a force between the computer mouse and a surface on which the computer mouse is moveable; and controlling the electromagnet based on an application running on a computer to which the computer mouse is connectable.

According to various embodiments, the electromagnet may be controlled based on a type of application running on the computer.

According to various embodiments, the type may include or may be an item selected from a list consisting of first person shooter games, multiplayer online battle arena games, and massively multiplayer online games.

According to various embodiments, the electromagnet may be controlled based at least one of a level of required precision for using the application or a level of required speed for using the application.

According to various embodiments, the computer-readable medium may further include instructions which, when executed by a computer, make the computer perform: determining a translatory movement of the computer mouse on the surface.

Figure 3:
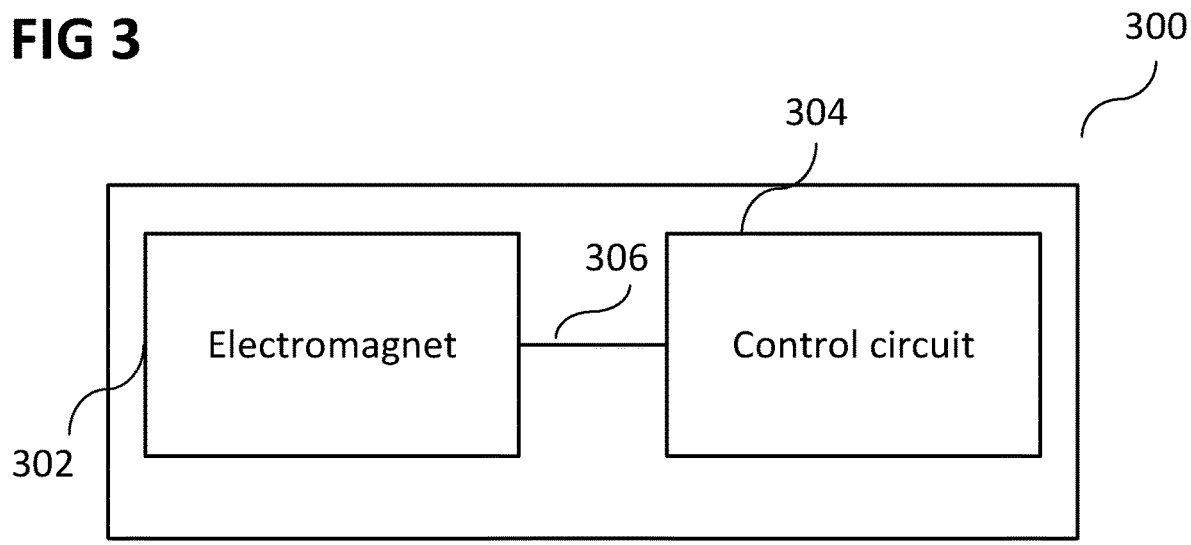
FIG. 3 shows a mouse pad according to various embodiments.

FIG. 3 shows a mouse pad 300 according to various embodiments. The mouse pad 300 may include an electromagnet 302 configured to provide a force between the mouse pad 300 and a computer mouse which is moveable on the mouse pad 300. The mouse pad 300 may further include a control circuit 304 configured to control the electromagnet 302 based on an application running on a computer to which the computer mouse (and/or the mouse pad 300) is connectable. The electromagnet 302 and the control circuit 304 may be coupled with each other, like indicated by line 306, for example electrically coupled, for example using a line or a cable, and/ or mechanically coupled.

In other words, according to various embodiments, an electromagnet in a mouse pad (in other words: mousemat) may be controlled to adjust the force between a computer mouse and the mousepad based on an application running on a computer to which the computer mouse is connected.

According to various embodiments, the control circuit 304 may be configured to control the electromagnet 302 based on a type of application running on the computer.

According to various embodiments, the type may include or may be an item selected from a list consisting of first person shooter games, multiplayer online battle arena games, and massively multiplayer online games.

According to various embodiments, the control circuit 304 may be configured to control the electromagnet 302 based at least one of a level of required precision for using the application or a level of required speed for using the application.

Figure 4:
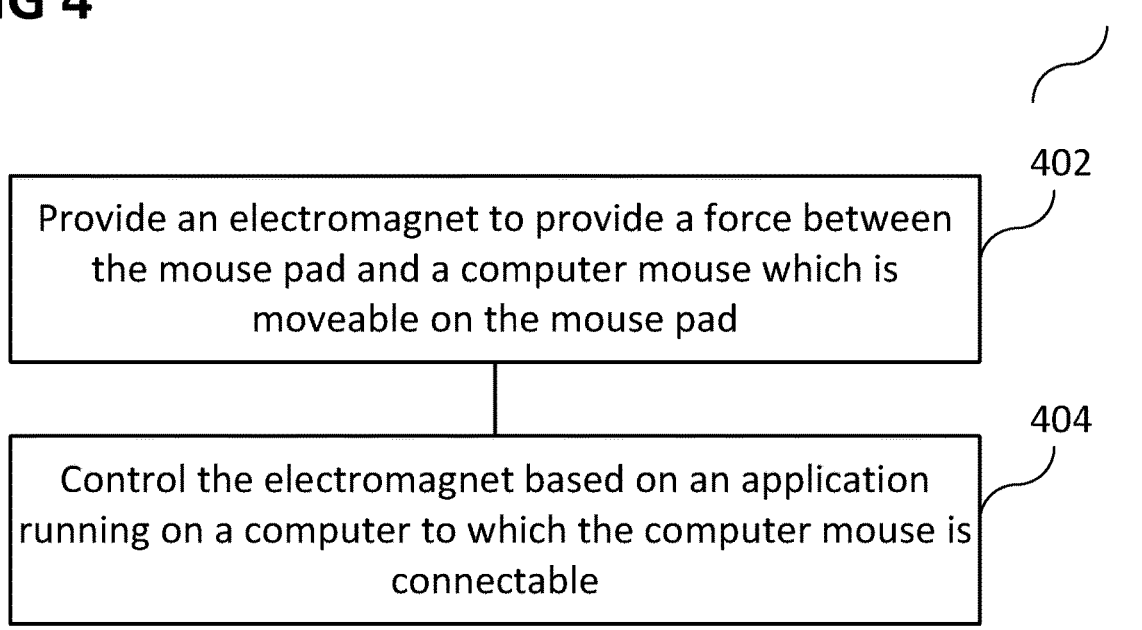
FIG. 4 shows a flow diagram illustrating a method for controlling a mouse pad according to various embodiments.

FIG. 4 shows a flow diagram 400 illustrating a method for controlling a mouse pad. In 402, an electromagnet may be provided to provide a force between the mouse pad and a computer mouse which is moveable on the mouse pad. In 404, the electromagnet may be controlled based on an application running on a computer to which the computer mouse is connectable.

According to various embodiments, the electromagnet may be controlled based on a type of application running on the computer.

According to various embodiments, the type may include or may be an item selected from a list consisting of first person shooter games, multiplayer online battle arena games, and massively multiplayer online games.

According to various embodiments, the electromagnet may be controlled based at least one of a level of required precision for using the application or a level of required speed for using the application.

According to various embodiments, a computer-readable medium may include instructions which, when executed by a computer, make the computer perform a method for controlling a mouse pad. The method may include: providing an electromagnet to provide a force between the mouse pad and a computer mouse which is moveable on the mouse pad; and controlling the electromagnet based on an application running on a computer to which the computer mouse is connectable.

According to various embodiments, the electromagnet may be controlled based on a type of application running on the computer.

According to various embodiments, the type may include or may be an item selected from a list consisting of first person shooter games, multiplayer online battle arena games, and massively multiplayer online games.

According to various embodiments, the electromagnet may be controlled based at least one of a level of required precision for using the application or a level of required speed for using the application.

Figure 5:
FIG. 5 shows a computer mouse according to various embodiments.

FIG. 5 shows a computer mouse 500 according to various embodiments. The computer mouse 500 may include a receiving port 502 configured to receive a permanent magnet for providing a force between the computer mouse 500 and a surface on which the computer mouse 500 is moveable.

According to various embodiments, the receiving port 502 may be configured to receive a magnet selected from a set of magnets with different strength.

According to various embodiments, the computer mouse 500 may be configured to determine a translatory movement of the computer mouse on the surface.

According to various embodiments, magnetism may be used to create and attraction or repulsion between the mouse and the mousemat (or any other surface, on which the mouse is moved), which consequently increases or decreases the friction between the two, which in turn modifies the glide.

According to various embodiments, permanent magnets may be used. According to various embodiments, the mouse mat (or any other surface, on which the mouse is moved) may have a metal surface or chassis which is attracted to magnets. The top surface of the mouse mat may be any material good for the mouse's tracking performance, but it may be thin enough to allow the magnetic attraction from the mouse to go through. According to various embodiments, the mouse may have feet that may be switched out and interchanged, and the mouse may come with different sets of feet which may have Teflon (or any other viable material) bases, but may have different sized magnets built into them. When the user wants to increase the friction between the mouse and the mouse mat, the user may replace the existing feet on the mouse with those with stronger magnets built in. The feet may be easily replaceable (in other words: hot swappable), and may be attached firmly to the mouse base by a mechanical clasp or other means.

According to various embodiments, electromagnets may be used on the mouse. According to various embodiments, the mouse mat may be the same as described above. One or more electromagnet(s) may be built into the mouse, and as close to the bottom of the mouse as possible, for a maximum reach to the mouse mat. With using electromagnets, the user may vary the power of the attraction between the mouse and the mouse mat using software, making it very convenient. Furthermore, the user may save different settings for different uses as needed, and switch between them instantaneously.

According to various embodiments, an axially magnetized mouse mat may be used. According to various embodiments, the mouse mat may axially magnetized, with the entire top surface of the mouse mat acting as the south pole or as the north pole. The mouse may be equipped with an electromagnet (for example with an electromagnet as described above). The user may be able to vary the force of the magnetic attraction and the polarity of the electromagnet by increasing/decreasing the current flowing through the magnet and by reversing the direction of the flow of the current in the electromagnet. This may in turn be used to cause the mouse and mouse mat to attract and repel each other, which may in turn increase and decrease the friction between them, respectively, affecting the glide accordingly. The strength of the attraction and repulsion may be varied, affecting the degree to which the friction is increased or decreased. The use of an electromagnet makes it possible for the user to use software to increase or decrease the level of attraction or repulsion, as may be desired, and instantly switch between these settings if so needed.

Various embodiments may enable users to customize the glide of their mouse on the mouse mat (or any other surface) to a much finer degree than would be possible otherwise, and may allow for a much wider spectrum of glide despite the use of just one surface.

Various embodiments may enable users to adjust their glide according to their particular needs at that time (for example, gaming vs. office use, or for different types of games).

According to various embodiments, an additional dimension of customization may be added for gamers.

The following examples pertain to further embodiments.

Example 1 is a computer mouse comprising: an electromagnet configured to provide a force between the computer mouse and a surface on which the computer mouse is moveable; and a control circuit configured to control the electromagnet based on an application running on a computer to which the computer mouse is connectable.

In example 2, the subject-matter of example 1 can optionally include that the control circuit is configured to control the electromagnet based on a type of application running on the computer.

In example 3, the subject-matter of example 2 can optionally include that the type comprises an item selected from a list consisting of first person shooter games, multiplayer online battle arena games, and massively multiplayer online games.

In example 4, the subject-matter of any one of examples 1 to 3 can optionally include that the control circuit is configured to control the electromagnet based at least one of a level of required precision for using the application or a level of required speed for using the application.

In example 5, the subject-matter of any one of examples 1 to 4 can optionally include that the computer mouse is configured to determine a translatory movement of the computer mouse on the surface.

Example 6 is a method for controlling a computer mouse, the method comprising: providing an electromagnet to provide a force between the computer mouse and a surface on which the computer mouse is moveable; and controlling the electromagnet based on an application running on a computer to which the computer mouse is connectable.

In example 7, the subject-matter of example 6 can optionally include that the electromagnet is controlled based on a type of application running on the computer.

In example 8, the subject-matter of example 7 can optionally include that the type comprises an item selected from a list consisting of first person shooter games, multiplayer online battle arena games, and massively multiplayer online games.

In example 9, the subject-matter of any one of examples 6 to 8 can optionally include that the electromagnet is controlled based at least one of a level of required precision for using the application or a level of required speed for using the application.

In example 10, the subject-matter of any one of examples 6 to 9 can optionally include determining a translatory movement of the computer mouse on the surface.

Example 11 is a computer-readable medium comprising instructions which, when executed by a computer, make the computer perform a method for controlling a computer mouse, the method comprising: providing an electromagnet to provide a force between the computer mouse and a surface on which the computer mouse is moveable; and controlling the electromagnet based on an application running on a computer to which the computer mouse is connectable.

In example 12, the subject-matter of example 11 can optionally include that the electromagnet is controlled based on a type of application running on the computer.

In example 13, the subject-matter of example 12 can optionally include that the type comprises an item selected from a list consisting of first person shooter games, multiplayer online battle arena games, and massively multiplayer online games.

In example 14, the subject-matter of any one of examples 11 to 13 can optionally include that the electromagnet is controlled based at least one of a level of required precision for using the application or a level of required speed for using the application.

In example 15, the subject-matter of any one of examples 11 to 14 can optionally include instructions which, when executed by a computer, make the computer perform: determining a translatory movement of the computer mouse on the surface.

Example 16 is a mouse pad comprising: an electromagnet configured to provide a force between the mouse pad and a computer mouse which is moveable on the mouse pad; and a control circuit configured to control the electromagnet based on an application running on a computer to which the computer mouse is connectable.

In example 17, the subject-matter of example 16 can optionally include that the control circuit is configured to control the electromagnet based on a type of application running on the computer.

In example 18, the subject-matter of example 17 can optionally include that the type comprises an item selected from a list consisting of first person shooter games, multiplayer online battle arena games, and massively multiplayer online games.

In example 19, the subject-matter of any one of examples 16 to 18 can optionally include that the control circuit is configured to control the electromagnet based at least one of a level of required precision for using the application or a level of required speed for using the application.

Example 20 is a method for controlling a mouse pad, the method comprising: providing an electromagnet to provide a force between the mouse pad and a computer mouse which is moveable on the mouse pad; and controlling the electromagnet based on an application running on a computer to which the computer mouse is connectable.

In example 21, the subject-matter of example 20 can optionally include that the electromagnet is controlled based on a type of application running on the computer.

In example 22, the subject-matter of example 21 can optionally include that the type comprises an item selected from a list consisting of first person shooter games, multiplayer online battle arena games, and massively multiplayer online games.

In example 23, the subject-matter of any one of examples 20 to 22 can optionally include that the electromagnet is controlled based at least one of a level of required precision for using the application or a level of required speed for using the application.

Example 24 is a computer-readable medium comprising instructions which, when executed by a computer, make the computer perform a method for controlling a mouse pad, the method comprising: providing an electromagnet to provide a force between the mouse pad and a computer mouse which is moveable on the mouse pad; and controlling the electromagnet based on an application running on a computer to which the computer mouse is connectable.

In example 25, the subject-matter of example 24 can optionally include that the electromagnet is controlled based on a type of application running on the computer.

In example 26, the subject-matter of example 25 can optionally include that the type comprises an item selected from a list consisting of first person shooter games, multiplayer online battle arena games, and massively multiplayer online games.

In example 27, the subject-matter of any one of examples 24 to 26 can optionally include that the electromagnet is controlled based at least one of a level of required precision for using the application or a level of required speed for using the application.

Example 28 is a computer mouse comprising: a receiving port configured to receive a permanent magnet for providing a force between the computer mouse and a surface on which the computer mouse is moveable.

In example 29, the subject-matter of example 28 can optionally include that the receiving port is configured to receive a magnet selected from a set of magnets with different strength.

In example 30, the subject-matter of any one of examples 28 to 29 can optionally include that the computer mouse is configured to determine a translatory movement of the computer mouse on the surface.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A computer mouse comprising:
   an electromagnet configured to provide a magnetic force between the computer mouse and a mouse pad having electromagnetic characteristics on which the computer mouse is moveable; and
   a control circuit configured to control the electromagnet of the computer mouse, to vary the magnetic force between the computer mouse and the mouse pad, based on a type of an application selected from a list of first person shooter games, multiplayer online battle arena games, and massively multiplayer online games running on a computer to which the computer mouse is connectable;
   wherein when the type of the application selected is of first person shooter games, the control circuit is configured to increase the magnetic force between the computer mouse and the mouse pad;
   wherein when the type of the application selected is of multiplayer online battle arena games or massively multiplayer online games, the control circuit is configured to decrease the magnetic force between the computer mouse and the mouse pad.

2. The computer mouse of claim 1,
   wherein the control circuit is configured to control the electromagnet based at least one of a level of required precision for using the application or a level of required speed for using the application.

3. The computer mouse of claim 1,
   wherein the computer mouse is configured to determine a translatory movement of the computer mouse on the mouse pad.

4. The computer mouse of claim 1 further comprising:
   a receiving port adapted to receive a permanent magnet to provide another magnetic force between the computer mouse and the mouse pad on which the computer mouse is moveable.

5. The computer mouse of claim 1 further comprising:
   a feet member comprising a permanent magnet to provide another magnetic force between the mouse pad and a computer mouse which is moveable on the mouse pad, the feet adapted to be detachably attached to a base of the mouse pad.

6. A method for control ling a computer mouse, the method comprising:

provSiding an electromagnet to provide a magnetic force between the computer mouse and a mouse pad having electromagnetic characteristics on which the computer mouse is moveable; and controlling the electromagnet of the computer mouse, to vary the magnetic force between the computer mouse and the mouse pad, based on a type of an application selected from a list of first person shooter games, multiplayer online battle arena games, and massively multiplayer online games running on a computer to which the computer mouse is connectable;

wherein when the type of the application selected is of first person shooter games, the control circuit is configured to increase the magnetic force between the computer mouse and the mouse pad;

wherein when the type of the application selected is of multiplayer online battle arena games or massively multiplayer online games, the control circuit is configured to decrease the magnetic force between the computer mouse and the mouse pad.

7. The method of claim 6, wherein the electromagnet is controlled based at least one of a level of required precision for using the application or a level of required speed for using the application.

8. The method of claim 6, further comprising:

determining a translatory movement of the computer mouse on the mouse pad.

9. A mouse pad comprising:

an electromagnet configured to provide a magnetic force between the mouse pad and a computer mouse having electromagnetic characteristics which is moveable on the mouse pad; and a control circuit configured to control the electromagnet of the mouse pad, to vary the magnetic force between the mouse pad and the computer mouse, based on a type of an application selected from a list of first person shooter games, multiplayer online battle arena games, and massively multiplayer online games running on a computer to which the computer mouse is connectable;

wherein when the type of the application selected is of first person shooter games, the control circuit is configured to increase the magnetic force between the mouse pad and the computer mouse;

wherein when the type of the application selected is of multiplayer online battle arena games or massively multiplayer online games, the control circuit is configured to decrease the magnetic force between the mouse pad and the computer mouse.

10. The mouse pad of claim 9, wherein the control circuit is configured to control the electromagnet based at least one of a level of required precision for using the application or a level of required speed for using the application.

11. The mouse pad of claim 9 further comprising:

a chassis having electromagnetic characteristics adapted to engage with the computer mouse having electromagnetic characteristics.

12. The mouse pad of claim 11, wherein the chassis comprises a metal.

* * * * *